United States Patent
Kolar et al.

(10) Patent No.: US 10,835,081 B2
(45) Date of Patent: Nov. 17, 2020

(54) BLENDING CONTAINER IDENTIFICATION SYSTEM

(71) Applicant: VITA-MIX MANAGEMENT CORPORATION, Olmsted Township, OH (US)

(72) Inventors: David J. Kolar, Stow, OH (US); Fred H. Mehlman, Brunswick, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 333 days.

(21) Appl. No.: 15/062,277

(22) Filed: Mar. 7, 2016

(65) Prior Publication Data

US 2016/0256004 A1   Sep. 8, 2016

Related U.S. Application Data

(60) Provisional application No. 62/129,310, filed on Mar. 6, 2015.

(51) Int. Cl.
| | | |
|---|---|---|
| *A47J 43/07* | (2006.01) | |
| *A47J 19/02* | (2006.01) | |
| *A47J 43/046* | (2006.01) | |
| *H04B 5/00* | (2006.01) | |
| *G06K 7/10* | (2006.01) | |
| *G06K 19/077* | (2006.01) | |

(52) U.S. Cl.
CPC .......... *A47J 43/0716* (2013.01); *A47J 19/02* (2013.01); *A47J 43/046* (2013.01); *A47J 43/0727* (2013.01); *G06K 7/10297* (2013.01); *G06K 19/07788* (2013.01); *H04B 5/0056* (2013.01)

(58) Field of Classification Search
CPC .. A47J 43/0716; A47J 43/046; A47J 43/0727; A47J 19/02; H04B 5/0056; G06K 7/10297; G06K 19/07788
USPC .......................................................... 366/130
See application file for complete search history.

(56) References Cited

U.S. PATENT DOCUMENTS 3,881,705 A * 5/1975 Greenspan ............ A47J 43/046
                                                       241/282.2
5,071,077 A    12/1991 Arroubi
(Continued)

FOREIGN PATENT DOCUMENTS

DE         19947466        5/2001
EP         0440051         1/1991
(Continued)

OTHER PUBLICATIONS

International Search Report and the Written Opinion of the International Searching Authority, PCT/US2016/021194, Vita-Mix Management Corporation, May 31, 2016.

*Primary Examiner* — Charles Cooley
(74) *Attorney, Agent, or Firm* — McDonald Hopkins LLC

(57) ABSTRACT

A blending system is provided for identifying a blending container. The blending system may include an attachment member that attaches to a blending container. The attachment member may include an identification tag. A receiving system may communicate with the identification tag to identify the container. The receiving system may measure characteristics of the blending container. The characteristics can be compared to stored characteristics.

7 Claims, 12 Drawing Sheets

(56) References Cited

U.S. PATENT DOCUMENTS

| | | | | |
|---|---|---|---|---|
| 6,637,681 B1* | 10/2003 | Planca | A47J 43/046 | 241/37.5 |
| 7,018,091 B2* | 3/2006 | Arroubi | A47J 43/0716 | 241/37.5 |
| 7,371,004 B1* | 5/2008 | Branson, III | A47J 43/046 | 366/130 |
| 7,384,182 B2* | 6/2008 | Bhavnani | A47J 43/046 | 366/130 |
| 7,426,839 B2* | 9/2008 | Beaudry | A47G 19/127 | 366/130 |
| 7,798,373 B1* | 9/2010 | Wroblewski | B05B 11/00 | 222/1 |
| 8,403,556 B2* | 3/2013 | Wu | A47J 43/0777 | 241/37.5 |
| 8,710,958 B2* | 4/2014 | Yang | B01L 3/545 | 264/4.33 |
| 8,851,739 B2* | 10/2014 | Gonzalez | A47J 43/046 | 366/130 |
| 8,985,488 B2 | 3/2015 | García | | |
| 9,035,222 B2* | 5/2015 | Alexander | A47G 19/027 | 165/58 |
| 9,149,155 B2* | 10/2015 | Vidal | A47J 36/16 | |
| 9,237,829 B2* | 1/2016 | Alet Vidal | B01F 13/0033 | |
| 9,247,850 B2* | 2/2016 | Alet Vidal | A47J 43/0465 | |
| 10,328,402 B2* | 6/2019 | Kolar | B01F 15/00201 | |
| 10,363,530 B2* | 7/2019 | Kolar | A47J 43/085 | |
| 10,413,131 B2* | 9/2019 | Kolar | H04B 5/0037 | |
| 10,687,669 B2* | 6/2020 | Kolar | A47J 43/0716 | |
| 2001/0036124 A1* | 11/2001 | Rubenstein | A47G 19/2205 | 366/205 |
| 2006/0126431 A1* | 6/2006 | Bhavnani | A47J 43/046 | 366/314 |
| 2008/0273420 A1* | 11/2008 | Ferk | A47J 43/0716 | 366/206 |
| 2008/0290090 A1* | 11/2008 | Kindler | A47J 27/0802 | 220/203.05 |
| 2011/0108570 A1* | 5/2011 | Jarisch | A47J 31/40 | 99/453 |
| 2013/0001220 A1* | 1/2013 | Alet Vidal | A47J 43/0465 | 219/622 |
| 2014/0269154 A1* | 9/2014 | Kolar | B01F 15/00201 | 366/142 |
| 2014/0286120 A1 | 9/2014 | Kolar | | |
| 2015/0098298 A1* | 4/2015 | Sapire | A47J 43/046 | 366/144 |
| 2016/0220973 A1* | 8/2016 | Kolar | B01F 15/00201 | |
| 2016/0256004 A1* | 9/2016 | Kolar | A47J 43/0716 | |
| 2017/0303744 A1* | 10/2017 | Sutton | A47J 43/0772 | |
| 2018/0020875 A1* | 1/2018 | Kolar | A47J 43/0766 | 366/279 |
| 2018/0059790 A1* | 3/2018 | Kolar | A47J 43/046 | |
| 2019/0001288 A1* | 1/2019 | Ciepiel | G07F 17/0064 | |
| 2019/0344232 A1* | 11/2019 | Kolar | A47J 43/085 | |

FOREIGN PATENT DOCUMENTS

| | | |
|---|---|---|
| EP | 2987438 | 2/2016 |
| FR | 2976780 | 12/2012 |

\* cited by examiner

BLENDING CONTAINER IDENTIFICATION SYSTEM

RELATED APPLICATIONS

This application claims the benefit of U.S. Provisional Patent Application Ser. No. 62/129,310, filed Mar. 6, 2015, and entitled "BLENDING CONTAINER IDENTIFICATION SYSTEM," the entirety of which is incorporated herein by reference.

TECHNICAL FIELD

The present invention relates to a blending system and, more particularly, to a blending system that identifies a blending container near a receiver.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Traditional blender systems may be designed to utilize a particular blending container with a particular blending base. For example, a blender base may have a dedicated blending container that is designed to attach to the blender base. If a user attaches the wrong blending container to the blender base, then the blender may not function properly. This can lead to spilled contents, excess noise, improper functioning of the blades, or the like.

In other instances, a user may use the proper blending container and blender base combination. However, the blending container may not be properly connected to the blender base. For example, the blending container may be misaligned with the blender base. Attempting to blend contents when the system is not properly aligned can also result in spilled contents, excess noise, improper functioning of the blades, or the like.

Therefore, a need exists for improved systems and methods for blending contents in a blender. Further, there is a need for determining whether a blending container and blender base are properly connected and/or compatible.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

Disclosed herein are blending systems, apparatuses and processes relating to blending or mixing systems. A blending system may include a blending container. An identification tag may be attached to the blending container. The identification tag may be embedded in an attachment member. The attachment member can be attached to a blending container and the blending container may be placed in proximity to a receiving device. The receiving device may communicate with the identification tag.

A receiving device may identify a blending container based on determining an identity of the blending container. Determining the identity of the blending container may include receiving an identifier and determining characteristics of the blending container. The receiving device may measure characteristics of the blending container and may monitor changes in the characteristics.

In another aspect, a method for identifying a blending container is disclosed herein. The method may include attaching an attachment member to a blender base. The attachment member and blender base may be positioned within a coverage area of a receiving device when the blender base, blending container and attachment member are operatively attached. The method may also include communicating data between the attachment member and the receiving device. The receiving device may measure a weight of the blending device and may compare the weight with an expected weight of the blending device.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which.

DETAILED DESCRIPTION

Figure 1:
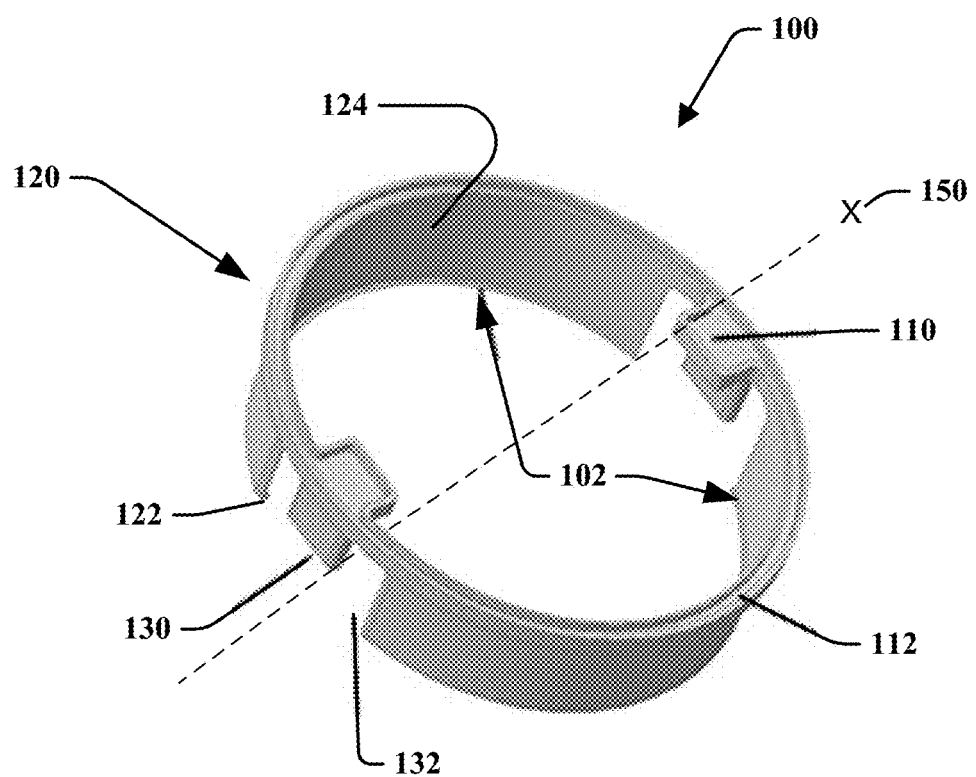
FIG. 1 is a top perspective view of an attachment member in accordance with various described embodiments.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments, not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms such as "access point," "server," and the like, are utilized interchangeably, and refer to a network component or appliance that serves and receives data-streams or signaling-streams. Data and signaling streams may be packetized or frame-based flows. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). Still further, "user," "customer," "consumer," may include a commercial establishment(s), such as a restaurant, restaurant chain, commercial kitchen, grocery store, convenience store, ice-cream shop, café, smoothie restaurant, or the like.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices, and is not limited to a single device.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blending systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blending container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Further, such terms are not intended to limit possible blended products and should be viewed as examples of possible blended products.

The terms "identification tag," identification chip," and the like may be used interchangeably, unless context suggests otherwise or warrants a particular distinction among such terms. An identification tag may refer to a radio frequency identification (RFID) chip, transponder, or tag, a near-field communications (NFC) chip or tag, and the like. Such identification tags may comprise printable RFID tags, NFC tags, tags including microchips, or the like. Identification tags can contain stored information, such as in a memory. In another aspect, an identification tag may be powered by electromagnetic induction from magnetic fields produced near a reader. For instance, an identification tag may include an NFC chip that uses electromagnetic induction between two loop antennas located within the container's near field, effectively forming an air-core transformer. The antennas may comprise various materials, such as copper. While an air-core transformer is described, various other antenna formations may be utilized.

As described herein, the identification tag may be a passive transponder that collects energy from interrogating radio waves and/or may include a local power source such as a battery. As such, an identification tag and a reader may be configured as a passive reader active tag system, active reader passive tag system, an active reader active tag system, or the like.

In another aspect, an identification tag may power various components or devices. For example, an NFC chip may power a digital display and/or interface of a container. In embodiments, the identification tag may be configured to operate and/or communicate with a reader when within a threshold distance. For instance, an identification tag may communicate with a reader when the identification tag is less than or equal to j units from the reader, where j is a number and a unit is a unit of distance. In an example, the identification tag may operate when it is less than or about six centimeters from the reader, when it is less than or about one meter from the reader, etc. It is noted that "near," "proximity," "near field," within a "cover area," and the like may generally refer to a distance such that the identification tag may communicate with a reader. The distance may depend on the specific devices used, a user setting, regulatory guidelines, or other subjective or objective parameters.

Aspects of systems, apparatuses or processes described herein generally relate to blending or mixing systems comprising a blending container. In an embodiment, an identification tag may be attached to the blending container. The identification tag may include an RFID tag, NFC tag, or the like. In another aspect, the identification tag may include and/or may be coupled to an antenna (e.g., an air coil antenna) or the like. The antenna may be utilized to transmit and/or receive signals. The identification tag may be embedded in a component of the blending container, in an attachment cuff or member, or the like. For instance, an attachment member may include a clasp comprising a material, such as plastic, metal, rubber, and the like. The identification tag may be at least partially embedded within the material attachment member. The attachment member can be attached to a blending container and the blending container may be attached to a blender base. In another aspect, the blending container/attachment member assembly may be placed on or near a receiving device for identification.

The receiving device may include a scale, a blender base, or another device configured for receiving a signal from the identification tag. In embodiments, the receiving device may include an identification component that includes an identification tag reader or interrogator. The identification component may communicate with the identification tag to transmit data to and/or receive data from the identification tag. The receiver device may utilize the received information to identify the blending container. The identification of the blending container may include determining a characteristic(s) of the blending container, such as a make and model, an expected weight of the container, an interlocking mechanism of the container, a proximity of the container, and the like.

In an example, a user may attach an attachment member to a retainer nut or simply a nut of a blending container. The attachment member may be configured to attach to a blending container by a user pressing the attachment member into place. The attachment member and blending container may generate a tactical or audible signifier (e.g., a snap) that indicates proper attachment or coupling. The user may place the container on or near a receiving device and an identification component (e.g., a reader) may communicate with an identification tag of the attachment member. The receiving device may include a measurement component that measures or determines a weight of the container. While embodiments may refer to movement of one component (e.g., a user moving a container), it is noted that other components may move or may be movable. For instance, a user may move a receiving device near a container. As such, reference to movement of a component may refer to a change in relative positions between components.

In another aspect, the receiving device may identify the blending container based on information received from the identification tag. The receiving device may determine characteristics of the blending container and/or may recall or receive characteristics from a memory, which may be internal and/or external to the receiving device. For instance, the receiving device may identify a make of a blender base and a blending container. If the blending container is compatible with the blender base—or blender system in general), then the receiving device, which may be the blender base or a portion of the blender base, may instruct the blender base to execute a blending process in response to receiving a user command or other triggering event. If the blending container is not compatible with the blender device or does not have an identification tag, then the receiving device may instruct the blender device to disable or prevent certain operations, such as activation of a motor and/or blade assembly.

For instance, the blender system may determine whether the blending container is operatively attached, such as by determining a proximity of the blending container and the blender base. Thus, a blending system may prevent spillage of contents, improper functioning of the blades, activation of the motor when components of the blender base are not operatively assembled, or the like. As described here, as well as elsewhere in this disclosure, a blender container, a blender lid, and/or a blender base may each comprise NFC components, which may send and/or receive data when within a coverage area of a transmitter/receiver. In at least one embodiment, the blender system may determine whether the entire system is operatively attached, such as by determining a proximity or proximities of the blending container, blender lid, and the blender base. In another aspect, the blending system may prevent use of improper or undesirable blending container and blender base combinations.

FIG. 1 is an attachment member 100 comprising an identification tag 110 that may be utilized by a blending system, in accordance with various described embodiments. It is noted that attachment member 100 may comprise various other shapes and/or configurations. As such, attachment member 100 is provided as an exemplary embodiment. For instance, embodiments of an attachment member may comprise various aspects described with reference to attachment member 100 but may include different configurations. For instance, while attachment member 100 is generally cylindrical and/or circular, attachment member 100 may represent a hexagonal prism shape. In an aspect, attachment member 100 may include or comprise one or more materials, such as food grade plastics, metals, rubbers, and the like. For example, the attachment member 100 may be made of polyesters, copolyester (e.g., TRITAN), or the like. In another aspect, attachment member 100 may be monolithically formed or it may be formed by attaching or adhering various components together.

Attachment member 100 may primarily include a latch body 120 (which may be configured for securing to a blending container). The body 120 may comprise at least one alignment post 130 (which may assist in aligning attachment member 100), at least one identification tag support 110 (which may receive an identification tag), and a track portion or member 112 which may receive an antenna member. It is noted that attachment member 100 may include different and/or additional components and configurations.

In an embodiment, body 120 may include one or more latch portions 102 that may extend from track member 112 in a generally cylindrical shape about an axis X 150. It is noted that the latch portions 102 may extend normally from the track member 112 or may extend at an angle. For instance, the latch portions 102 may represent a cross-section of a generally conical shape. Likewise, track member 112 may be generally circular, generally elliptical, or of a various other shape. Such designs may depend, at least in part, on the blending container to which the attachment member 100 operatively attaches. The diameters and/or measurements (e.g., length, height, etc.) of perimeters of the track member 112 and latch body 120 may depend, at least in part, on a blending container to which the attachment member 100 may attach and/or a design or programming of an identification tag. For example, a perimeter of latch portions 102 may represent a cross-section of an m sided prism or the like, where m is a number. It is noted that various irregular shapes may also be utilized. Moreover, latch portions 102 may comprise a strap, an adjustable clasp, elastic material, or the like. As such, latch portions 102 may comprise different shapes and/or dimensions.

Latch portions 102 may be separated by or may comprise a cut-out(s) 132. Cut-out 132 may include a region of latch body 120 where material is substantially removed or absent. While embodiments may refer to a cut-out or cut-outs, it is noted that such cut-outs may or may not be formed through cutting of latch body 120. For instance, body 120 may be molded such that cut-out 120 never comprise a material. In another instance, body 120 may be initially formed such that there are no gaps in a perimeter of latch portions 102. Then the cut-out 120 may be formed by removing material of latch portions 102. In another aspect, the cut-out 120 may allow for flexibility or stress relief when the attachment member is attached or is being attached to the blending system.

An alignment post(s) 130 may include a protrusion from a portion of track member 112 and/or body 120. The alignment post 130 may be configured to align attachment member 100 when in an attached configuration with a blending container. For instance, alignment post 130 may be proximal to a portion of a retainer nut and/or may couple to a portion of a retainer nut, such as a groove. In an aspect, proper alignment may allow a blender container to be operatively connected to a blending device.

While alignment post 130 is depicted as extending normally from the track member 112, it is noted that the alignment post 130 may extend at an angle, may extend from latch body 120, may be adjustable (e.g., bendable, etc.), or the like. For example, alignment post 130 may extend perpendicularly from an inner wall of latch portions 102 (e.g., towards axis X). Moreover, while an alignment post is described, it is noted that various other means of alignment may be utilized. For instance, an alignment member in general may be utilized. An alignment member may include a groove, ridge, cleat, threaded member, magnets, or the like.

Identification tag support(s) 110 may include a protrusion that extends from track member 112. The identification tag support 110 may be configured for receiving an identification tag. As noted herein, the identification tag may include an RFID tag, an NFC tag, or the like. In an embodiment, an identification tag may be placed on the identification tag support 110 and an antenna of the identification tag may be placed in track member 112. Track member 112 may include a track or groove that may assist in supporting or retaining the antenna. Once the antenna and identification member are positioned on or in the track member 112 and identification tag support 110, the identification tag support 110 and track member 112 may be sealed. Sealing may include depositing a material, such as epoxy, rubber, metal, plastic, and the like over and/or within the track member 112 and/or identification tag support 110. It is noted that supporting an antenna may include enclosing, housing, or otherwise allowing an antenna to be positioned.

In at least one embodiment, the identification tag support 110 may not support or receive an identification tag. For example, an identification tag may be disposed within or on a latch portions 102. According to another example, the identification tag support(s) 110 may include one or more antennas and/or identification tags, and a receiving device may be operatively configured to communicate with the one or more antennas and/or identification tags. Furthermore, the position, number, size, and orientation of the identification tags may depend at least in part on the position of an antenna of a receiving device. For instance, a receiving device may comprise a transmitter/receiver that is disposed parallel to axis X 150, perpendicular to axis X 150, or the like—when a blender device is operatively assembled. As such, the position, number, size, and orientation of the identification tags may be suitably configured based on the receiving device.

In embodiments, sealing the identification tag and antenna member may include providing a protective barrier to isolate the identification tag and antenna from an external atmosphere or environment. For instance, exposure of the identification tag and/or antenna may allow for damage from the water, foodstuff, or other contaminants that may corrode or otherwise harm the identification tag and antenna. In at least one embodiment, the identification tag and antenna may be isolated and/or protected such that the attachment member 100 is washable, dishwasher safer, or the like. As noted herein, identification tag and antenna may be removably attached to attachment member 100. For example, the identification tag and the antenna may be embedded within a separate component (not shown). The separate component may then be attached to the attachment member 100. Thus, the identification tag and antenna may be removed such that attachment member 100 may be washed or cleaned. Further, having a removable identification tag and antenna may allow for replacement or repair of attachment member 100, the identification tag, and/or the antenna.

In at least one embodiment, the attachment member 100 may include a semi-rigid material, a flexible material, or the like. As an example, latch body 120 may include a plastic that may be deformed (e.g., bent, flexed, etc.) such that an inner wall 124 of latch body 120 may press against and/or contact a retainer nut of a blending container. The deformation may result in latch portions 102 supplying a restorative force against the retainer nut. In at least one embodiment, one or more flanges or cleats 122 may protrude from a portion of the latch portions 102. The cleat 122 may be disposed along a distal end of latch portions 102. The cleat 122 may clip to or latch to a retainer nut. It is noted that attachment member 100 may include different numbers of cleats and/or different configurations of such cleats.

It is further noted that the inner wall 124 may be configured to contact other portions of a blending container. For example, some containers may not comprise a retainer nut. In such instances, attachment member 100 may attach to other portions of a blending container. In other examples, attachment member 100 may be configured to attach to another portion of a blending container regardless of whether the blending container comprises a retainer nut. For instance, the attachment member 100 may attach to a handle of a blending container, an apron of a blending container, a lip or top of a blending container, a body or wall of a blending container, or the like. For example, attachment member 100 may attach to a perimeter of a single serving blending container.

While examples described herein may refer to a latched, cleated, or other connections, it is noted that attachment member 100 may be attached to a blending container, lid, or other portion of a blender system via various devices or methods. For instance, attachment member 100 may magnetically, adhesively, closely (e.g., friction fit), or otherwise attach to a container. It is further noted that attachment may include various clips, threaded connections, fasteners, or the like.

As described herein, the attachment member 100 may be removably or irremovably attached to a blending container, retainer nut, lid, or other portion of a blending device. In an example, the attachment member 100 may be over molded, irremovably adhered to, formed with, or otherwise attached to the blending device. It is further noted that the shape, size, and design of the attachment member 100 may be altered as desired without departing from the scope and spirit of this disclosure. For instance, the attachment member 100 may comprise a flexible material that may include or receive an adhesive on a first side, and may be adhered to a portion of the blending device. In another example, the attachment member 100 may be formed within a blender container, be positioned between a retainer nut and a blender container, or the like.

Figure 2:
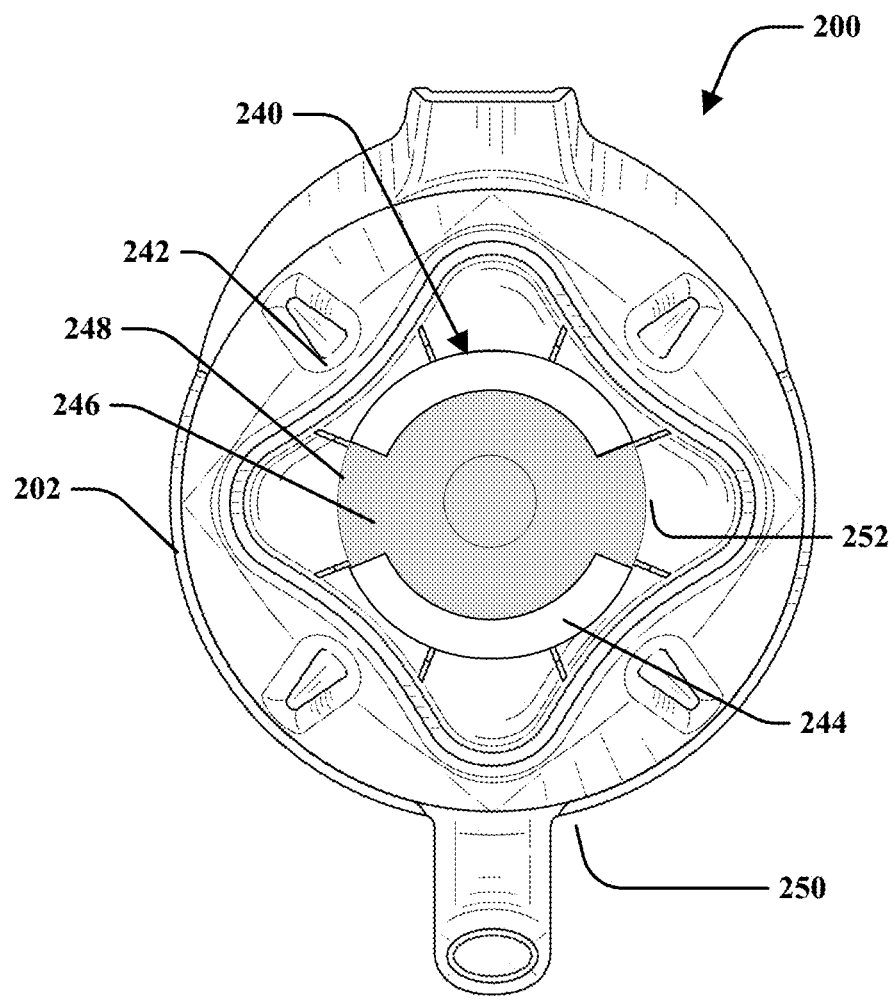
FIG. 2 is a bottom perspective view of a blending container in accordance with various described embodiments.

Turning to FIG. 2, illustrated is a bottom perspective view of a blending container 200 that may be utilized with an attachment member, in accordance with various embodiments disclosed herein. Blending container 200 is depicted in an inverted configuration such that retainer nut 240 is visible. Retainer nut 240 may be removably and/or irremovably attached to blending container 200. In an aspect, retainer nut 240 may be separated from a blender cavity 250. The blender cavity 250 may be configured for receiving and/or containing foodstuff to be blended. Thus, retainer nut 240 is generally not in contact with contents within blender cavity 250. In an aspect, retainer nut 240 may be at least partially surrounded by an apron 202. The apron 202 may prevent and/or reduce an amount of spilled contents that reaches the retainer nut 240.

In an embodiment, retainer nut 240 may comprise walls 242 and 244 that may extend from a base 246. Walls 242 and 244 may be separated such that any liquid or other substance may flow out of and away from retainer nut 240. In another aspect, walls 242 and 244 may be configured to interact or interlock with a blender base or other receiving device. The interlocking may prevent or reduce movement of the container 200 during a blending process. It is noted that various designs of container 200 and retainer nut 240 may be utilized. For example, a retainer nut may comprise a different number of walls or the like. Furthermore, walls 242 and 244 may comprise different shapes or dimensions. As depicted, retainer nut 240 may comprise a generally circular formation that represents a cross-section of a generally cylindrical shape. However, it is noted that retainer nut 240 may comprise various other shapes, such as, but not limited to, a shape that represents a cross-section of a generally conical shape, a general prism shape, an irregular shape, or the like.

According to at least one embodiment, an attachment member (e.g., attachment member 100) may be attached to the retainer nut 240. In examples, however, attachment member 100 may be attached to other portions of blending container 200. When attached to the retainer nut 240, inner wall 124 may contact at least a portion of a surface of the retainer nut 240, such as an outer perimeter 248. In another aspect, cleat 122 may latch to a bottom 252 of retainer nut 240, a ledge, a lip, or other portion of retainer nut 240. For instance, a user may position the attachment member 100 over the retainer nut 240. The user may then press or push the attachment member 100. As the user presses the attachment member 100, the latch portions 102 may be deformed (e.g., bent). The user may continue to press the attachment member 100 until cleat 122 latches to bottom 252 of retainer nut 240. In an aspect, at or about the time of positioning the attachment member 100 in place, the attachment member 100 and/or the retainer nut 240 may produce a tactile response and/or audible response. For instance, the attachment member 100 may snap or click into place. In at least one embodiment, the latch portions 102 may return to about the initial position before deformation.

As described herein, attachment member 100 and retainer nut 240 may comprise various designs. In embodiments, a specific attachment member may be designed to attach to a specific retainer nut of a blending container or other portion of a blending container. For example, an attachment member may be designed for attachment to a particular make and model of a blending container. In at least one embodiment, an attachment member may be designed to attach to various different blending container models and/or configurations of retainer nuts or other portion of a blending container, such as apron 202, a handle, or other portion of a container.

Figure 3:
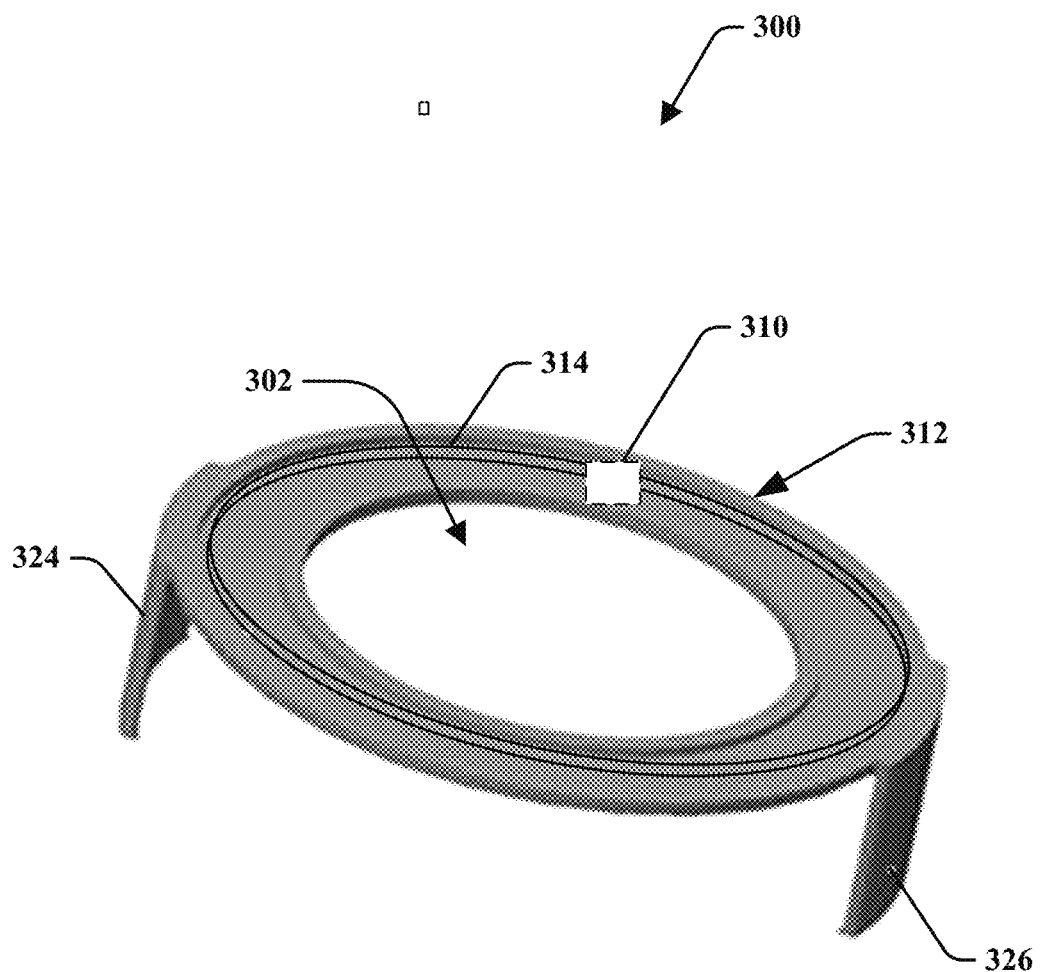
FIG. 3 is a top perspective view of an attachment member comprising an identification tag in accordance with various described embodiments.

FIG. 3 is a front perspective view of an attachment member 300 comprising a flattened track member, in accordance with various described embodiments. As depicted, attachment member 300 may primarily include a flattened track member 312, an identification tag 310, an antenna 314, a first latch portion 324, and a second latch portion 326. As described herein, the various components may be unitarily formed and/or removably attached, formed of different materials, and the like. For instance, the flattened track member 312, first latch portion 324, and second latch portion 326 may be formed of a common material that is molded or printed (e.g., via a three-dimensional printer).

In embodiments, identification tag 310 may include a chip (e.g., memory and/or controller) coupled with antenna 314. Antenna 314 may comprise a metal material formed in one or more loops. The loop antenna may comprise a portion of an air-core coil or transistor system with a receiver in near field communication applications. In an aspect, the identification tag 310 and antenna 314 may be at least partially embedded within track member 312, coated by a protective layer, or otherwise isolated from an external environment. In at least one embodiment, identification tag 310 and antenna 314 may be comprised within a separate component that may be attached to attachment member 300.

Figure 4:
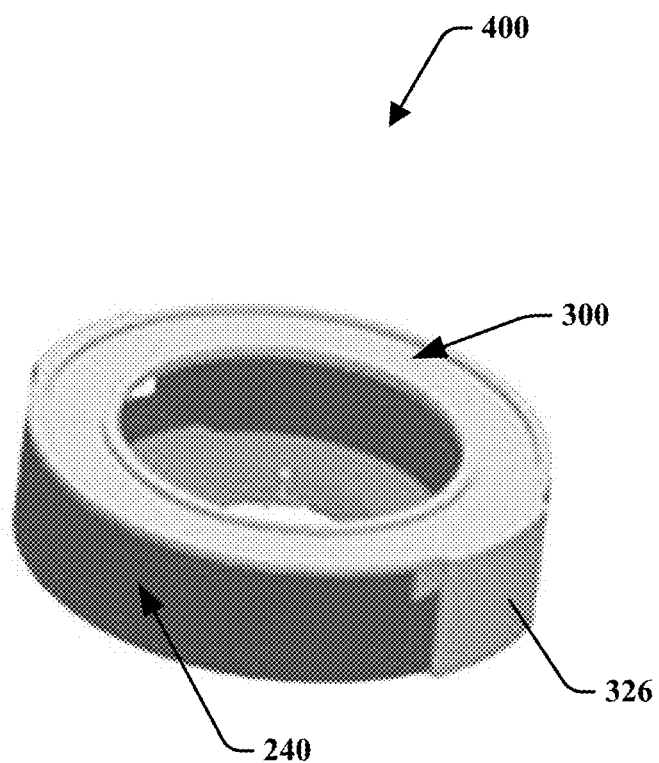
FIG. 4 is a top perspective view of an assembly including an attachment member and a retainer nut in accordance with various described embodiments.

Attachment member 300 may be attached to retainer nut 240 as depicted in FIG. 4. More particularly, FIG. 4 is a perspective view of an assembly 400 comprising attachment member 300 and retainer nut 240 in accordance with various embodiments disclosed herein. In an aspect, first latch portion 324, and second latch portion 326 may clip onto a portion of retainer nut 240, such as via a cleat, magnet, friction-fit, or the like. Thus, attachment member 300 may be removably attached to retainer nut 240. Removability may be beneficial for washing, storage, repair/replacement, use on other containers, and the like. In an example, attachment member 300 may be submerged in a liquid, subject to heat, and the like. For instance, attachment member 300 may be dishwasher safe such that antenna 314 and identification tag 310 are protected from potentially harsh environments.

Figure 5:
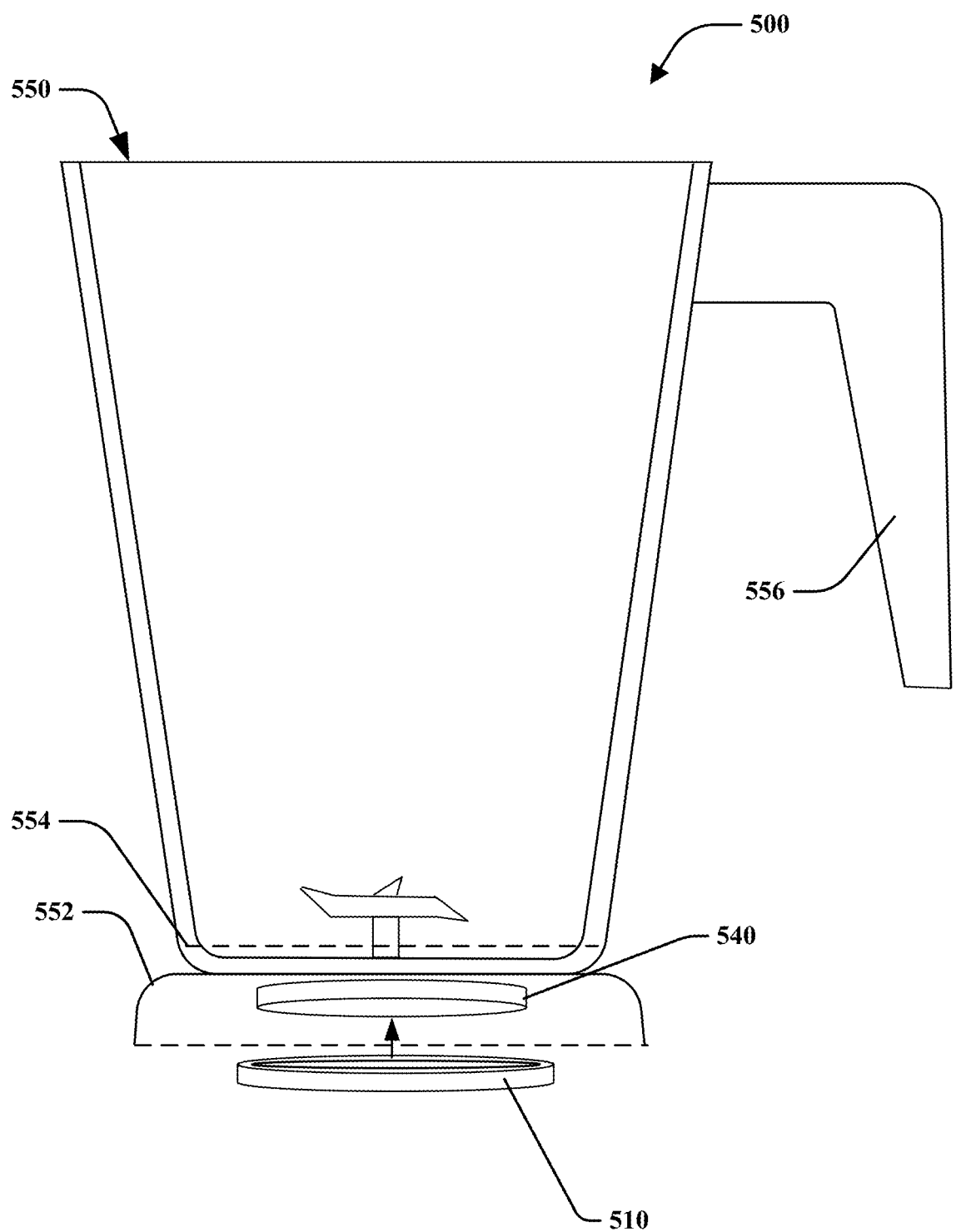
FIG. 5 is a partial cross-sectional view of a blending system in accordance with various described embodiments.

FIG. 5 is a partial cross-section of a blending system in accordance with various embodiments disclosed herein. A blending container 550 can comprise or be coupled with a retainer nut 540. An attachment member 510 may be attached to the retainer nut 540. It is noted that the attachment member 510 may at least partially surround a perimeter of the retainer nut 540. In various aspects, the attachment member 510 may comprise an identification tag as described herein.

While attachment member 510 is depicted as fitting around retainer nut 540, it is noted that other configurations are within the scope and spirit of this disclosure. In at least one embodiment, the attachment member 510 may be configured to be inserted within a retainer nut 540. In another embodiment, attachment member 510 may be configured to attach to apron 552, perimeter 554, handle 556, a lid (not shown), or other components of blending container 550. Moreover, attachment member 510 may be configured to attach to containers of various shapes and sizes. As described herein, a receiving component may identify proximity of the portion of a blender device that may be attached or attachable with attachment member 510. Such may allow the blender device to determine whether the system is operatively interlocked. Furthermore, if the blender base and blending container are not compatible or otherwise determined to be not operatively interlocked, the blender base may disable blending processes (e.g., disable operation of a motor and/or blade assembly.

In an example, a company may produce a number of different containers or blending devices. The different models may have specific geometries that may allow or prevent the attachment member 510 from operatively attaching to certain containers. Thus, a receiving device may be able to properly identify the container with a reduced possibility that a user has attached the attachment member 510 to an improper or unexpected container. For instance, the company may produce specific attachment members for one or more of their models.

As another example, an identification chip of the attachment member 510 may operatively communicate with a receiver system (e.g., wireless receiver/transmitter, etc.) via a communication protocol. The communication protocol may include encryption, specific instructions, data structures, or the like that allow for communication. In an aspect, this may prevent undesired, unapproved, or improper devices, containers, communication devices, or the like from communicating with the disclosed systems. For instance, an identification chip may be configured to communicate with blender devices or other devices (e.g., scales, smartphones running a mobile application, etc.) made, approved, or otherwise associated with a specific manufacturer.

Figure 6:
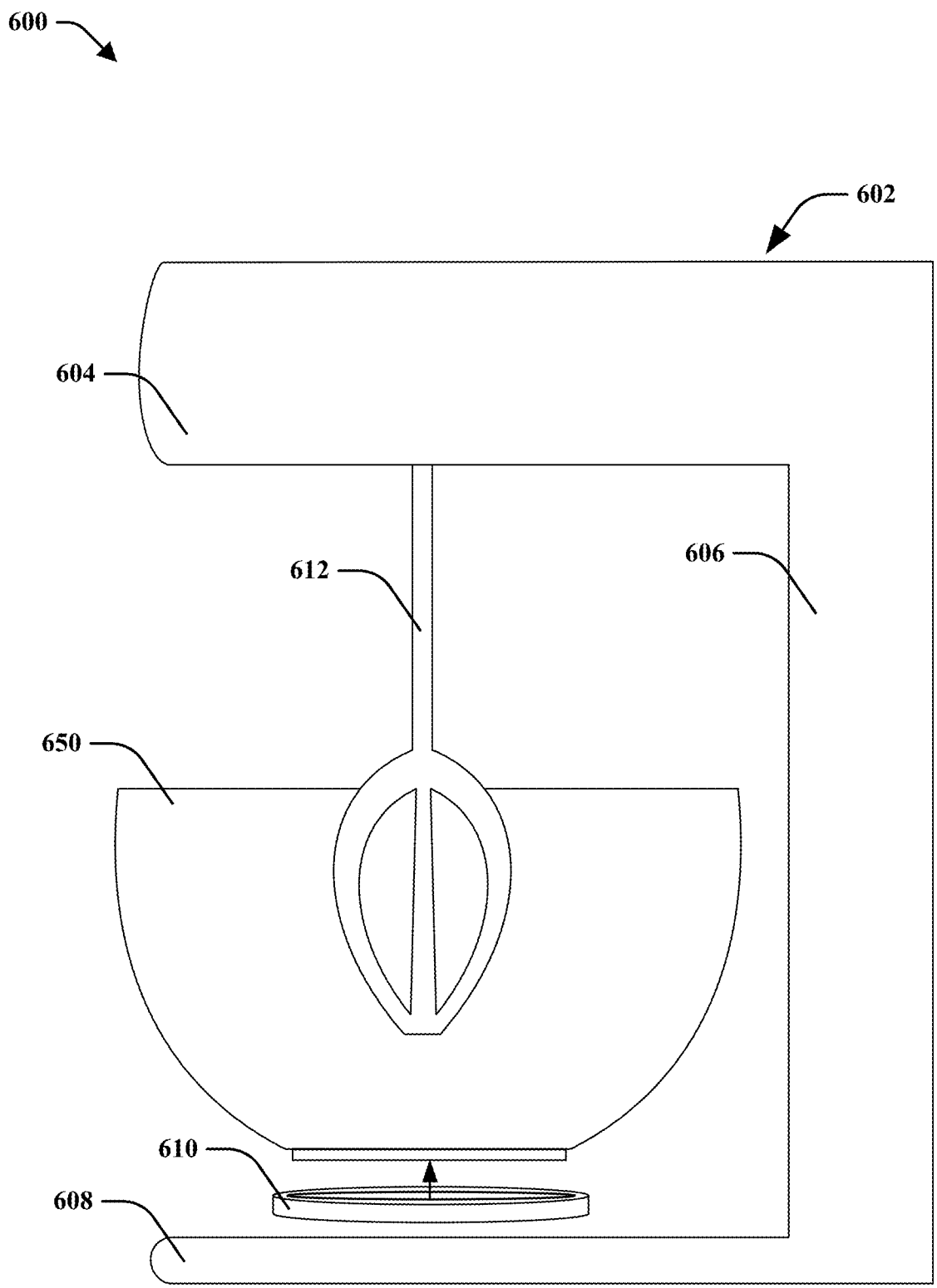
FIG. 6 is a partial cross-sectional view of a blending system including a mixing device in accordance with various described embodiments.

Turning to FIG. 6, there is a partial cross-sectional view of blending system 600 in accordance with various embodiments described herein. In an aspect, blending system 600 may include a mixing device 602 that may primarily include an arm member 604, a support member 606, and a foot member 608. In another aspect, an agitator member 612 may extend from the arm member 604. The arm member 604 may include a motor that drives or otherwise manipulates the agitator member 612. It is noted that the motor may be comprised in other portions of mixing device 602. Furthermore, the various components may be removably or irremovably attached.

Container 650 can receive foodstuff for blending and/or mixing. In an example, the container 650 may be a blending container, a mixing container, or the like. In at least one embodiment, the container 650 may include a bowl shape, pitcher shape, cup shape, or the like. An attachment member 610 may be attached to the container 650. For instance, the attachment member 610 may be attached to a pedestal 652 of container 650. It is noted that attachment member 610 may be attached to various other portions of container 650. While depicted as generally cylindrical, it is further noted that attachment member 610 may comprise various other configurations as described herein.

In embodiments, attachment member 610 may include an identification tag as described in various embodiments. The identification tag may communicate with a reader. The reader may be comprised within one or more components of the mixing device 602. For instance, a reader may be comprised within at least one of arm member 604, support member 606, foot member 608, and/or agitator member 612.

Figure 7:
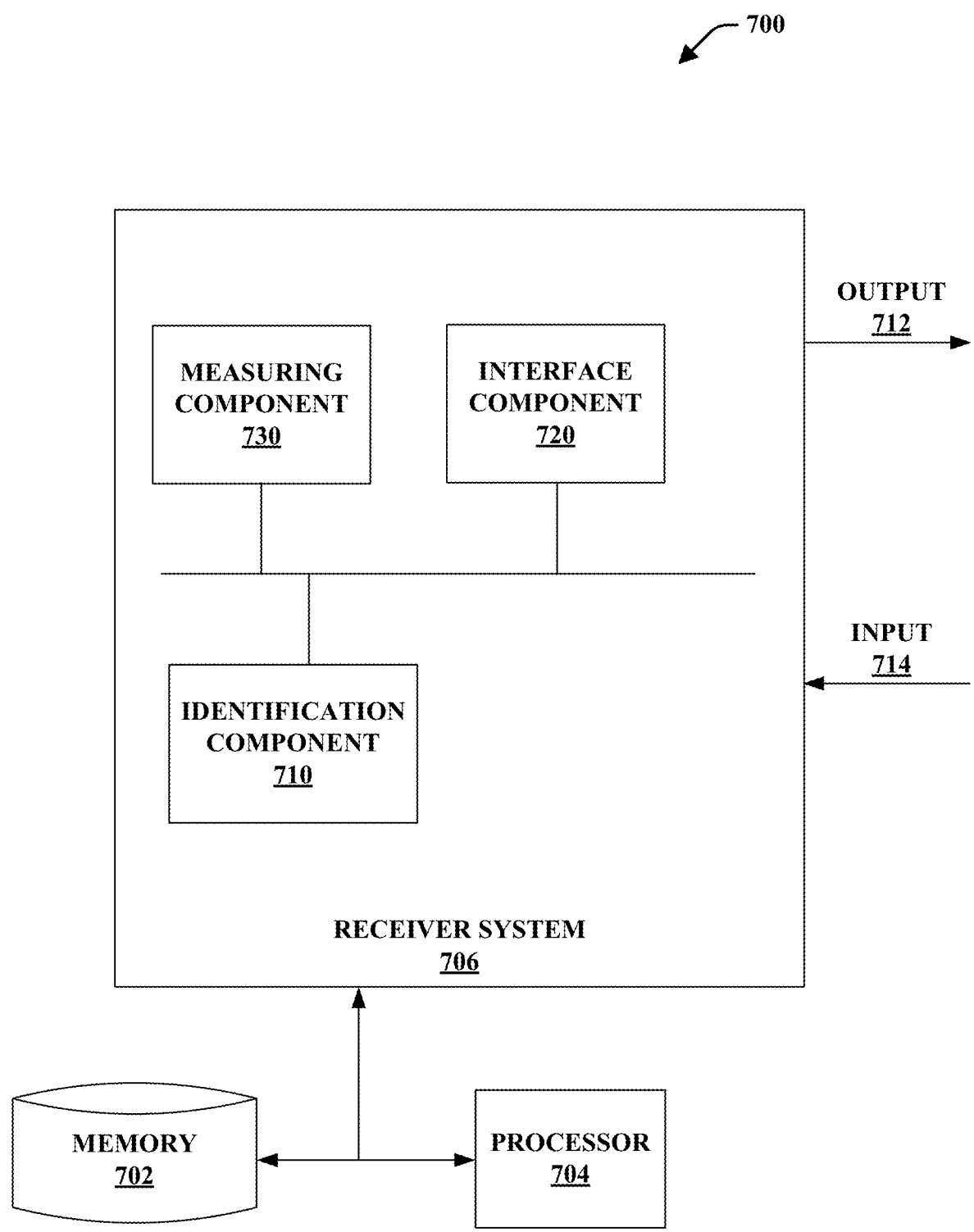
FIG. 7 is a functional block diagram of a blending system including an identification component in accordance with various described embodiments.

FIG. 7 is a block diagram of a functional receiver system 700 that may identify a blending container and determine properties of the blending container. Receiver system 700 may primarily include receiver system 706, memory 702, and processor 704. Memory 702 may be configured for storing computer executable components such as, but not limited to, an identification component 710, an interface component 720, and a measuring component 730. Processor 704 may facilitate operation of the computer executable components. It is noted that receiver system 700 may include one or more devices, such as a user device, a blender device, and/or a scale. It is further noted that one or more devices may comprise, at least in part, the various components. For instance, a single component of blender system 700 may be comprised by one or more devices. While shown as separate or distinct components, the components of receiver system 700 may be comprised by one or more components. Moreover, while memory 702 and processor 704 are depicted as separate from receiver system 706, it is noted that receiver system 706 may comprise memory 702 and processor 704. Further, blender system 700 may include a plurality of blending devices that may be linked together through a network and transceivers. These blending devices may be operatively linked with a server that may operate or otherwise update the plurality of blending devices.

Identification component 710 may include a reader or interrogator that may communicate with an identification tag (e.g., identification tag 310, etc.). The identification tag may be included within or attached to a blending container. In embodiments, the identification component 710 may comprise an emitter, reader, writer, and/or the like. In an aspect, identification component 710 may generate a signal comprising data that requests or induces a response from the identification tag. The identification component 710 may receive the response and may identify the blending container based on the response.

As described herein, the identification component 710 may be configured for reading or interrogating identification tags, including but not limited to, RFID tags, NFC tags, or the like. In an aspect, the identification tag may be a passive tag that is dormant until it is placed in proximity with identification component 710 while identification component 710 is performing an interrogation or reading process. For instance, identification component 710 may generate a signal at a determined frequency to excite the identification tag. When identification component 710 excites the identification tag to elicit a response, then identification component 710 may receive the response from the identification tag. The received data may be associated with an identity of a blending container. The identity may comprise a unique or semi-unique identifier associated with a container profile. For instance, the identity may be a series of characters of bits of data that may be assigned to a container profile. It is noted that the identification component 710 may utilize various frequencies, communication protocols, and the like. It is further noted that the identification component 710 may communicate with an identification tag comprising a power supply, active (e.g., non-passive) identification tags, and the like. In another aspect, an identifier may comprise data describing the device. The data may include a model type, volumetric capacity, weight, height, blender program compatibility, history of usage information, or the like.

In at least one embodiment, identification component 710 may compare received data to a memory (e.g., memory 702) to identify a blending container to which an identification tag is attached. Identifying the blending container may include determining a match between the received data and data stored in the memory. For example, a set of identifiers may be stored in a table or other data structure in a memory. The identification component 710 may receive an identifier from an identification tag and/or decode data received from the identification tag to determine an identifier. The identifier may then be compared to stored identifiers.

In embodiments, the identification tag may be associated with a container profile. The container profile may include characteristics or parameters of a blending container. For instance, the container profile may include information such as make and model of the blending container, weight of the blending container (e.g., with and without a lid, attachments, and the like), compatible blender bases, size of the blending container (e.g., capacity, height, volume, etc.), interlock of the blending container, color, name of the blending container, date purchased, date profile was created, and the like. In another aspect, the container profile may store a history of use associated with a blending container as described in more detail herein.

An identifier and/or profile may be predetermined for an attachment member and/or blending container. For instance, an attachment member (e.g., attachment member 100, 300, etc.) may be configured to attach to a specific blending container (e.g., make and model). An identifier communicated from the identification tag to the receiver system 706 may be associated with a stored identifier prior to or in the absence of a registration process. In an embodiment, the stored identifier may comprise predetermined or prepopulated fields of a container profile. For example, a user may attach an attachment member to a blending container. The blending container may be placed within a coverage area of the receiver system 706. Receiver system 706 may receive data from an identification tag and may determine, based on the data, characteristics of the blending container, such as the make and model. As described in various embodiments, the receiver system 706 may receive information that may directly identify the characteristics of the blending container. For instance, the identification tag may comprise a memory device that stores the characteristics.

In at least one embodiment, identification component 710 may register a blending container/attachment member. As noted above, an attachment member (e.g., attachment member 100, 300, etc.) may be configured to attach to various different makes and models of blending containers. Thus, in some embodiments, an identifier stored by an attachment member (e.g., an identification tag) could be associated with various makes and models of blending containers depending on the blending container to which the attachment member is attached. As such, identification component 710 may perform or execute a registration process that may automatically or manually (e.g., based on user input 714) associate a blending container with an identity. For instance, an attachment member coupled to a blending container may be detected by identification component 710. The identification component 710 may determine whether an identifier received from an identification tag is associated with a stored identity/container profile. If the received identity is associated with a stored identity, identification component 710 may identify the blending container. If the received identity is not associated with a stored identity, the identification component 710 may utilize a registration process to assign or register the blending container with an identity.

Registering the blending container may include storing a received signal from an identification tag in memory 702 and/or writing an identity to the identification tag. It is noted that the registration process may depend on the type of identification tag that is attached to the blending container. For instance, a passive identification tag may be read-only (e.g., not writeable). Thus, the registration process for a read-only identification tag may not include writing a new identifier to the identification tag.

It is noted that the registration process may automatically or manually determine an identity (e.g., make, model, etc.). In an embodiment, identification component 710 may automatically determine a make and model based on measurements received from the measuring component 730. For example, measuring component 730 may measure a weight of the blending container and identification component 710 may compare the measured weight with stored weight information associated with makes and models of blending containers. If the measured weight matches a stored weight or is within a threshold variance, then identification component 710 may assign a container profile (e.g., make and model) and/or a set of possible profiles to the blending container. The assigned profile may be associated with the received identifier and the association may be stored in a memory (e.g., memory 702). In another aspect, an identifier may be written to the identification tag. For example, when a blending container is matched with a profile and/or identity, a new or updated identifier may be written to the identification tag. The updated identifier may be an identifier previously associated with a profile and/or may be a new identifier. It is noted that identification component 710 may utilize various other measurements besides weight, to determine an identity of a blending container. It is further noted that a user may provide input 614 to alter (e.g., override, select, etc.) a determined or assigned profile.

In embodiments, identification component 710 may manually register a blending container. Manual registration may be based, at least in part, on user input. For instance, identification component 710 may detect a blending container comprising or coupled to an identification tag. The identification component 710 may further receive user input 714 that comprises identification information, such as a selected make and model, a selected profile, or the like. The identification component 710 may store the received user input and associate the input with the blending container. In at least one embodiment, the user may provide input by selecting a profile and/or identity of a blender from a set of stored profiles and/or identities. Furthermore, it is noted that a user may provide input to instruct identification component 710 to create custom fields in a profile. For example, a user may provide input 614 to name a blending container as, "Pat's Blending container."

While the registration process has been described as occurring upon an initial or first use, it is noted that the registration process may be utilized at various other times or upon detection of a triggering event. For example, a user may interact with interface component 720 to provide input. Interface component 720 may include a display, input devices (e.g., touch screen, buttons, dials, etc.). The interface component 720 may receive the input and identification component 710 may determine that the input comprises instructions to execute a registration process. In another aspect, a user may provide, and system 700 may receive, input 714. The input 714 may comprise an indication that the user desires to manually edit an identity, remove an identity, or otherwise alter an identity. It is further noted that various other characteristics may be associated with an identity. For instance, a user may name a blending container, assign a color to a blending container, and the like.

In embodiments, identification component 710 may utilize a reader or other component to determine a proximity of a blending container. For example, a reader may determine the proximity as near or far. The determination may be based on whether an identification is detected within a coverage area of the reader, a measured signal strength, and/or the like.

In another aspect, identification component 710 may determine whether an identified blending container is compatible with a blender base. For instance, receiver component 706 may be at least partially comprised within a blender base and/or may communicate with the blender base (e.g., such as a near field communication device of a blender base). The receiver component 706 may identify the blending container and may determine whether an interlocking mechanism of the blending container is compatible with an interlocking mechanism of the blender base. Interface component 720 may generate an output (e.g., via a display, a speaker, a light, etc.) indicating whether the blender base and blending container are compatible. In an example, if the blender base and blending container are not compatible, the blender base may disable blending processes.

Measuring component 730 may include a scale, sensor, or other device capable of determining a quantity. For instance, measuring component 730 may include a scale that measures a weight or mass. It is noted that the scale may be comprised within a blending device or may be a standalone device. As such, the scale may communicate with other components (e.g., such as via a wireless or wired connection).

In various embodiments, measuring component 730 may determine a weight of a blending container. The measuring component 730 may compare the measured weight with an expected weight, such as a weight in a container profile. The measuring component 730 may determine if the blending container comprises an ingredient, a blade assembly, a lid, or the like. In another aspect, a user may provide information regarding the contents of a blending container. If the blending container is empty and the measured weight is not within a threshold weight of an expected weight, the measuring component 730 may determine that the blending container is not the expected weight. If the blending container is not the expected weight, then the blending container may be non-compatible, improper, damaged, or the like.

Measuring component 730 may monitor weights of ingredients added to the blending container. The measuring component 730 may communicate, via a wireless or wired connection, the weight to another device, such as a smart phone, tablet, or other computing device. In some instances, measuring component 730 may not have wireless or wired communication capabilities. In such instances, a user may read a measurement from a display of measuring component 730 and may supply the measurement as input to another system, such as through an interface (e.g., touch screen, etc.). In embodiments, a user may override measurement data from measuring component 730. For instance, a user may review a weight of an ingredient and may alter the weight.

In another aspect, the measuring component 730 may determine a level associated with an amount of contents added to the blending container. For instance, measuring component 730 may compare a weight of ingredients to determine whether contents within the blending container are at capacity, over capacity, below capacity, or the like. In another aspect, measurement component 730 may select or generate a blending process based on the measurements.

Figure 8:
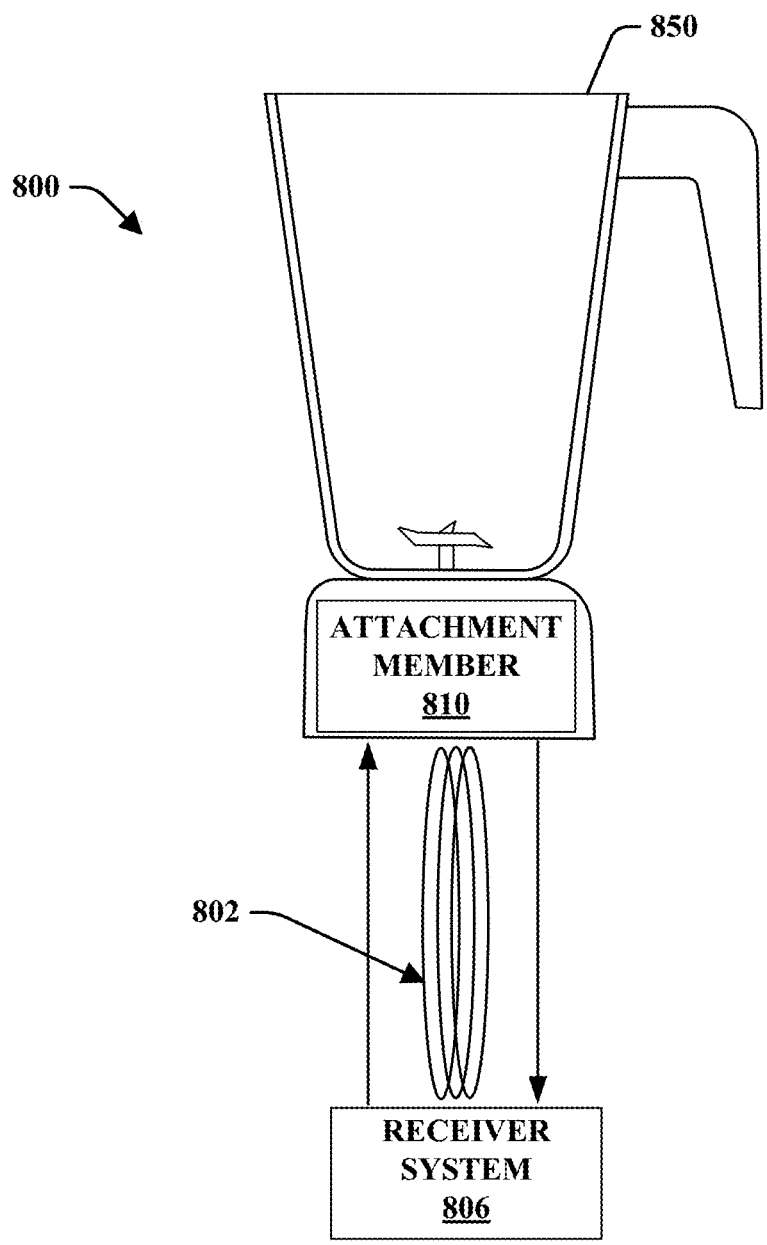
FIG. 8 is an environmental view of a blending system including a receiver system in accordance with various described embodiments.

Turning to FIG. 8, illustrated is a blender system 800, in accordance with various disclosed embodiments. Blender system 800 may include an attachment member 810 that may be attached to a blending container 850. It is noted that like-named components may include similar functionality or features. For instance, receiver system 806 may include all or some components of receiver system 706 and/or may perform all or some processes as described with reference to receiver system 706.

The attachment member 810 may include an identification tag as described with reference to the disclosed embodiments. A receiver system 806 may communicate with the identification tag. In at least one embodiment, the identification tag may include an NFC tag and the receiver system 806 may include an NFC emitter. In an aspect, the NFC tag and NFC emitter may each include one or more antennas. For instance, the NFC tag can include a loop antenna and the NFC emitter may include another loop antenna. It is noted that the loop antennas may or may not be substantially similar to each other. The NFC tag antenna and NFC emitter antenna may be coupled via an electromagnetic field 802. The coupling may form or represent an air-core coil or transformer. The NFC emitter may generate an alternating current that may pass through the NFC emitter antenna. The current may induce an electromagnetic field 802 thru the air. The electromagnetic field 802 may induce a current in the NFC tag antenna. The received current may provide power to the NFC tag.

In various embodiments, the NFC tag may include the antenna (e.g., inlay) and a memory device. The memory device may include various types of memory, such as electrically erasable programmable read-only memory (EEPROM) and the like. When the NFC tag is powered (e.g., current induced by the electromagnetic field 802), the NFC tag may generate a response that may be received by the NFC emitter.

Figure 9:
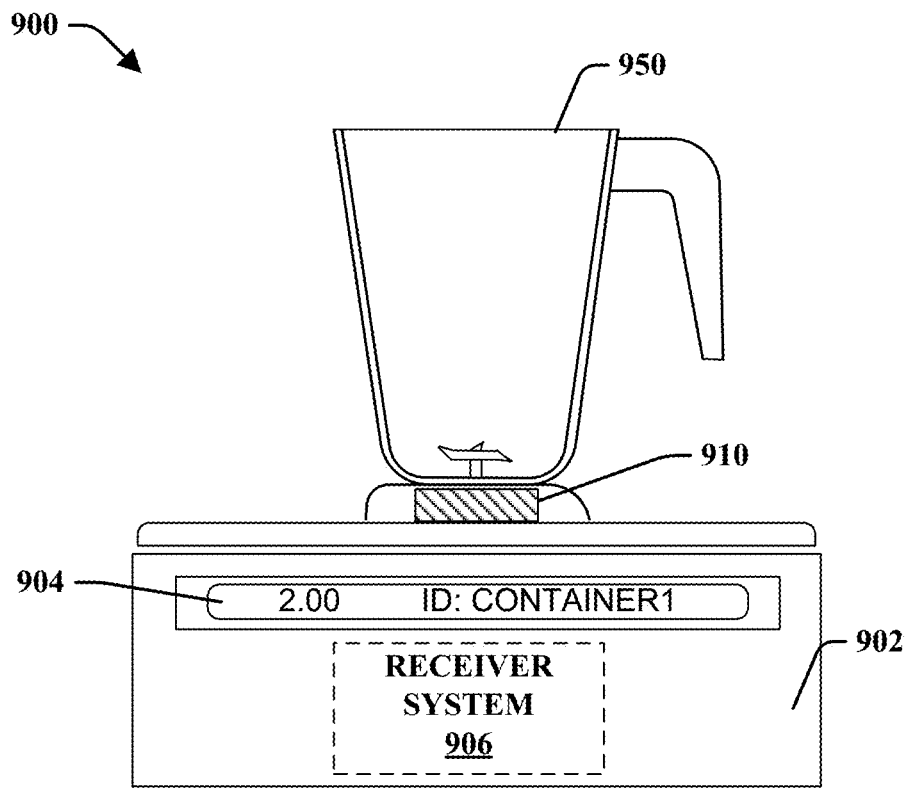
FIG. 9 is an environmental view of a blending system including a measurement system in accordance with various described embodiments.

FIG. 9 is a partial cross-sectional front view of a blending system 900, in accordance with various embodiments disclosed herein. Blending system 900 may include an attachment member 910 that is attached to a blending container 950. The blending container 950 and attachment member 910 assembly may be in communication with a receiver system 906 comprised within a scale device 902. Here as well as elsewhere in this disclosure, like-named components may include similar functionality or features.

Scale device 902 may be configured to determine a weight of objects and/or display information via an interface 904. The interface 904 may render information including a weight, a device identification, and the like. In another aspect, a user may utilize a user interface device (e.g., touch screen, remote, key pad, etc.) to provide information to the receiver system 906.

It is noted that various components of scale device 902 may be comprised within separate devices or systems. For example, interface 904 may include, in place of or in addition to the illustrated interface, an interface of a tablet computer, smart phone, personal digital assistant, touch screen, personal computer, laptop computer, wearable device, and the like. Moreover, scale device 902 may include or may be coupled to a memory and processor.

Figure 10:
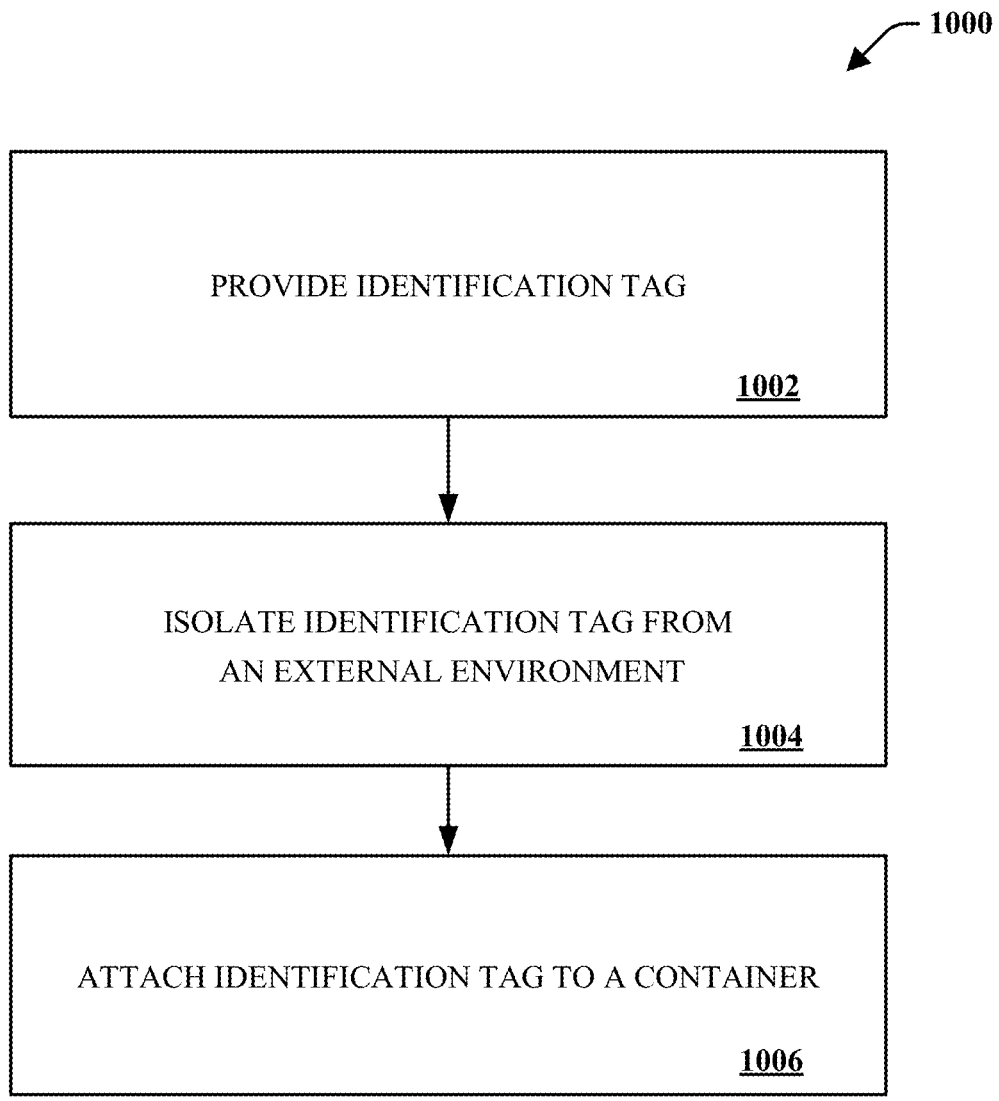
FIG. 10 is a flow diagram of an exemplary method associated with a blender system that may attach an identification tag to a container in accordance with various described embodiments.
Figure 11:
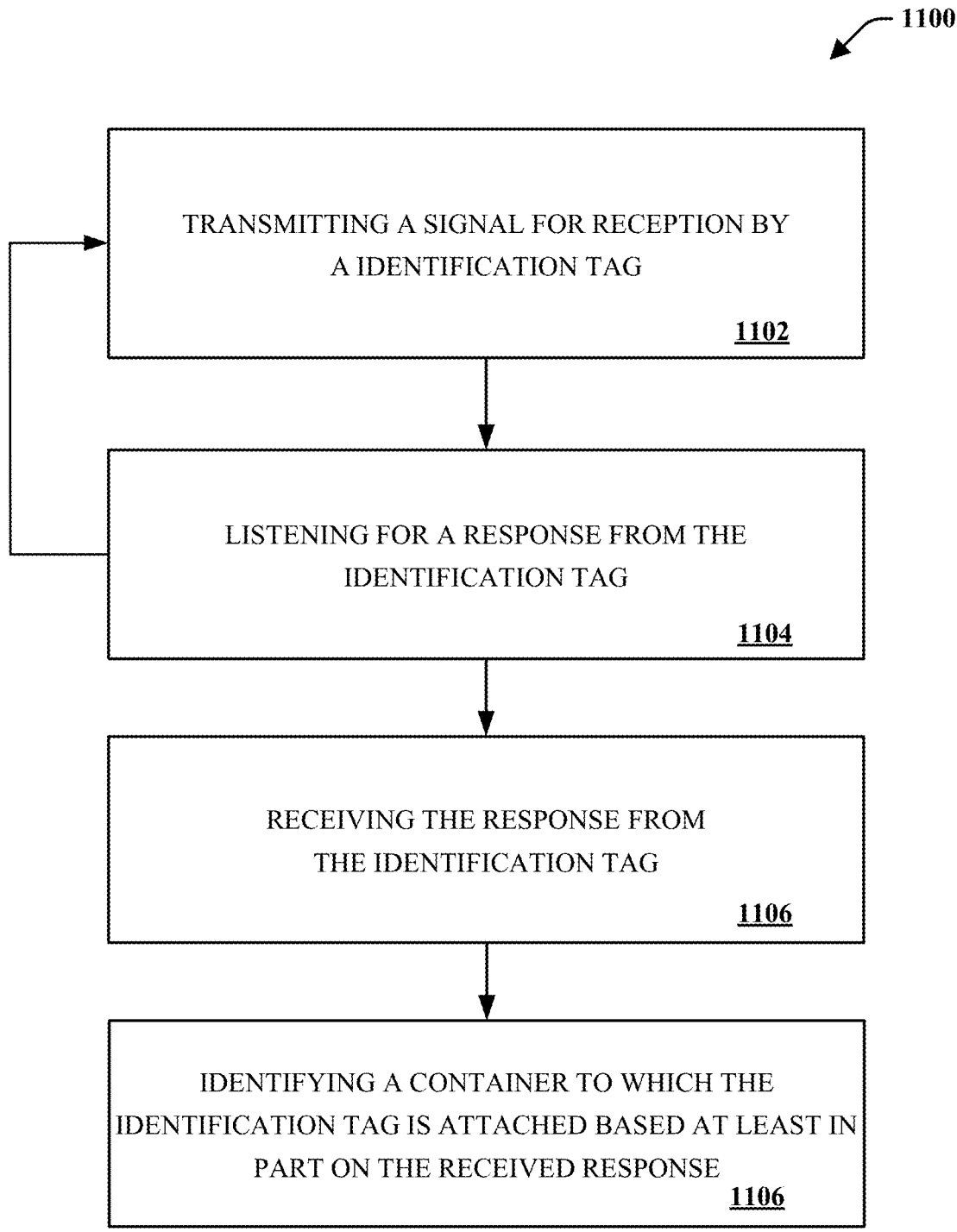
FIG. 11 is a flow diagram of an exemplary method associated with a blender system that may identify a blending container in accordance with various described embodiments.

In view of the subject matter described herein, methods that may be related to various embodiments may be better appreciated with reference to the flowcharts of FIGS. 10-11. While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 10 depicts an exemplary flowchart of non-limiting method 1000 associated with a blending system, according to various aspects of the subject disclosure. As an example, method 1000 may generate or construct an attachment member that may be attached to a blending container. Further, method 1000 may facilitate implementation identification of the blending container.

At 1002, an identification tag may be provided. The identification tag may be disposed or otherwise positioned on an identification tag support (e.g., identification tag support 110). It is noted that the identification tag may be positioned by a user, an automated device, and/or by other means.

At 1004, the identification tag may be isolated from an external environment. Isolating the identification tag may include sealing, over molding (e.g., depositing a material thereon, etc.), or otherwise providing a barrier between the identification tag and an external environment. For instance, an identification tag may be positioned on an identification tag support. A food grade plastic may then be deposited over the identification tag and/or identification tag support. In various embodiments, isolation of the identification tag may allow an attachment member to be exposed and/or at least partially submerged in fluid, dishwasher safe, heat resistant, chemical resistant, and/or the like.

At 1006, an identification tag may be attached, via an attachment member, to a container as described above. It is noted that the identification tag may be attached by an end user, at a factory, by a person, by mechanical devices (e.g., automated machines), and/or the like. It is further noted that the attachment member may be configured to attach to containers having various shapes, sizes, purposes, and/or the like. Moreover, the attachment member may be attached to one or more portions of a container, including, but not limited to, a base, a retainer nut, a handle, a lid, or the like.

FIG. 11 depicts an exemplary flowchart of non-limiting method 1100 associated with a blending system that identifies a container, according to various aspects of the subject disclosure. As an example, method 1100 may perform a listening procedure to detect an identification tag.

At 1102, transmitting, by a system (e.g., receiver system 706, receiver system 806, etc.), a signal for reception by an identification tag. In embodiments, a signal may be generated to have a specific frequency and/or to be within a range of frequencies. In another aspect, the signal may be generated according to a protocol that is associated with a blending system. In another aspect, the signal may be transmitted via an emitter, which may include an antenna member.

At 1104, listening, by the system (e.g., via identification component 710, etc.), for a response from the identification tag as described above. In an aspect, the response may include a response induced by a current from an electromagnetic field. In at least one embodiment, the identification tag may include a separate power supply and may generate a signal via the power supply.

At 1106, receiving, by the system (e.g., receiver system 706, receiver system 806, etc.), the response from the identification tag. The response may include an identifier and/or other information, such as profile information. The profile information may include a weight, a color, a name, and the like. In an aspect, the identification tag may generate a response and/or the receiver system may receive the response when the identification tag and the receiver system are within a threshold distance. It is noted that the threshold distance may include relatively small distances (e.g., less than three inches) to large distances. The threshold distance may be configured based on the type of identification tag and/or a reader chosen.

At 1108, identifying, by the system (e.g., receiver system 706, receiver system 806, etc.), a container to which the identification tag is attached based at least in part on the received response. For instance, the response may include a unique (e.g., globally or locally unique) identifier associated with the container. A system may identify the container based at least in part on the identifier. In another aspect, the system may identify the container based on other characteristics, such as a measure weight, measure dimensions (e.g., height, width, etc.), or the like.

Figure 12:
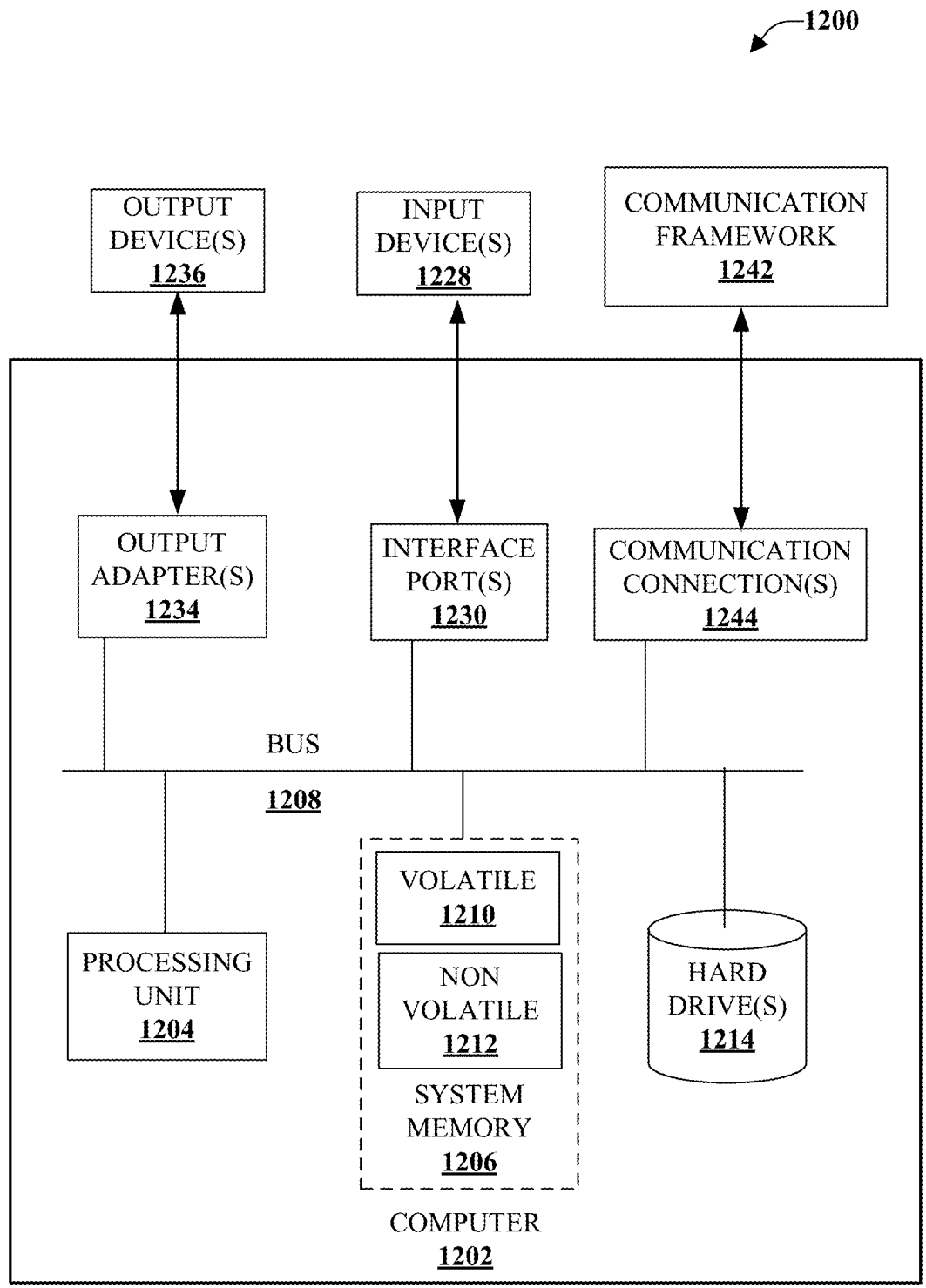
FIG. 12 is a block diagram of a functional computer system in accordance with various described embodiments.

What has been described above may be further understood with reference to the following figure. FIG. 12 provides an exemplary operating environment or system capable of implementing one or more systems, apparatuses, or processes described above. FIG. 12 is not intended to limit the scope of such systems, apparatuses, or processes. By way of example, computer system 1200 may refer to one or more embodiment of the various embodiments described with reference to the above figures. However, variations to computer system 1200 may be obvious to achieve aspects or processes described herein.

FIG. 12 is a block diagram of a computer system 1200 that may be employed to execute various disclosed embodiments. It is noted that various components may be implemented in combination with computer executable instructions, hardware devices, and/or combinations of hardware and software devices that may be performed by computer system 1200.

Computer system 1200 may include various components, hardware devices, software, software in execution, and the like. In embodiments, computer system 1200 may include computer 1202. Computer 1202 may include a system bus 1208 that couples various system components. Such components may include a processing unit(s) 1204, system memory device(s) 1206, disk storage device(s) 1214, sensor(s) 1235, output adapter(s) 1234, interface port(s) 1230, and communication connection(s) 1244. One or more of the various components may be employed to perform aspects or embodiments disclosed herein. In an aspect, the computer system 1200 may identify a blending container and/or identify characteristics of a blending container as described above. For example, the computer system 1200 may read an identification tag attached to a blending container and may determine whether a weight of the blending container is within an expected weight range.

Processing unit(s) 1204 may comprise various hardware processing devices, such as single core or multi-core processing devices. Moreover, processing unit(s) 1204 may refer to a "processor," "controller," "computing processing unit (CPU)," or the like. Such terms generally relate to a hardware device. Additionally, processing unit(s) 1204 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the like.

System memory 1206 may include one or more types of memory, such as volatile memory 1210 (e.g., random access memory (RAM)) and non-volatile memory 1212 (e.g., read-only memory (ROM)). ROM may include erasable programmable ROM (EPROM), electrically erasable programmable ROM (EEPROM). In various embodiments, processing unit(s) 1204 may execute computer executable instructions stored in system memory 1206, such as operating system instructions and the like.

Computer 1202 may also include one or more hard drive(s) 1214 (e.g., EIDE, SATA). While hard drive(s) 1214 is depicted as internal to computer 1202, it is noted that hard drive(s) 1214 may be external and/or coupled to computer 1202 via remote connections. Moreover, input port(s) 1230 may include interfaces for coupling to input device(s) 1228, such as disk drives. Disk drives may include components configured to receive, read and/or write to various types of memory devices, such as magnetic disks, optical disks (e.g., compact disks and/or other optical media), flash memory, zip drives, magnetic tapes, and the like.

It is noted that hard drive(s) 1214 and/or other disk drives (or non-transitory memory devices in general) may store data and/or computer-executable instructions according to various described embodiments. Such memory devices may also include computer-executable instructions associated with various other programs or modules. For instance, hard drives(s) 1214 may include operating system modules, application program modules, and the like. Moreover, aspects disclosed herein are not limited to a particular operating system, such as a commercially available operating system.

Input device(s) 1228 may also include various user interface devices or other input devices, such as sensors (e.g., microphones, pressure sensors, light sensors, etc.), scales, cameras, scanners, facsimile machines, and the like. A user interface device may generate instructions associated with user commands. Such instructions may be received by computer 1202. Examples of such interface devices include a keyboard, mouse (e.g., pointing device), joystick, remote controller, gaming controller, touch screen, stylus, and the like. Input port(s) 1230 may provide connections for the input device(s) 1228, such as via universal serial ports USB ports), infrared (IR) sensors, serial ports, parallel ports, wireless connections, specialized ports, and the like.

Output adapter(s) 1234 may include various devices and/or programs that interface with output device(s) 1236. Such output device(s) 1236 may include LEDs, computer monitors, touch screens, televisions, projectors, audio devices, printing devices, or the like.

In embodiments, computer 1202 may be utilized as a client and/or a server device. As such, computer 1202 may include communication connection(s) 1244 for connecting to a communication framework 1242). Communication connection(s) 1244 may include devices or components capable of connecting to a network. For instance, communication connection(s) 1244 may include cellular antennas, wireless antennas, wired connections, and the like. Such communication connection(s) 1244 may connect to networks via communication framework 1242. The networks may include wide area networks, local area networks, facility or enterprise wide networks (e.g., intranet), global networks (e.g., Internet), satellite networks, and the like. Some examples of wireless networks include Wi-Fi, Wi-Fi direct, BLUETOOTH™, Zigbee, and other 802.XX wireless technologies. It is noted that communication framework 1242 may include multiple networks connected together. For instance, a Wi-Fi network may be connected to a wired Ethernet network. In at least one embodiment, the computer system 1200 may download or receive profiles associated with blending containers. The profiles may contain information such as weight, color, purchase date, and the like.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer-process running on a processor, a processor, a device, a process, a computer thread, or the like. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender system for blending foodstuff, the blender system comprising:
   a blender container;
   a blade assembly operatively attached to the blending container;
   a lid operatively attachable to the blender container; and
   an attachment member operatively attached to the blender container opposite the lid, wherein the attachment member comprises:
     at least one tab;
     an annular track member extending from the at least one tab;
     a transmitter supported by the at least one tab; and
     a loop antenna supported by the annular track member and operatively coupled to the transmitter.

2. The blender system of claim 1, wherein the attachment member further comprises a latch portion attached with the at least one tab, the latch portion operatively attaching the least one tab to the blender container.

3. The blender system of claim 2, wherein the latch portion comprises a cleat that operatively secures the at least one tab to a retainer nut of the blender container.

4. The blender system of claim 1, wherein the annular track member comprises a groove that operatively receives the loop antenna.

5. The blender system of claim 4, wherein the groove is overmolded to hermetically seal the loop antenna.

6. A blender system for blending foodstuff, the blender system comprising:
   a blender container;
   a blade assembly operatively attached to the blending container;
   a lid operatively attachable to the blender container;
   an attachment member operatively attached to the blender container opposite the lid such that the attachment member remains attached to the blender container when the blender container is not attached with the lid and is not attached to a blender base; and
   a blender base comprising a transmitter, wherein the blender container is operatively attached to the blender base;
   wherein the attachment member comprises a body, an annular track member extending from the body, a transmitter supported by the body, and an antenna supported by the annular track member and operatively coupled to the transmitter,
   wherein the transmitter includes a memory storing an identification token associated with the blender container,
   wherein the blender base operatively receives the identification token when the blender container is within a coverage area of the transmitter of the blender base.

7. A blender system for blending foodstuff, the blender system comprising:
   a blender container;
   a blade assembly operatively attached to the blending container;
   a lid operatively attachable to the blender container;
   an attachment member operatively attached to the blender container opposite the lid such that the attachment member remains attached to the blender container when the blender container is not attached with the lid and is not attached to a blender base; and
   a blender base comprising a transmitter, wherein the blender container is operatively attached to the blender base;
   wherein the attachment member comprises a body, an annular track member extending from the body, a transmitter supported by the body, and an antenna supported by the annular track member and operatively coupled to the transmitter,
   wherein the transmitter includes a memory storing an identification token associated with the blender container,
   wherein the blender base at least one of modifies a history of use associated with the identification token or selects a blending process based on the identification token.

* * * * *